No. 802,109. PATENTED OCT. 17, 1905.
F. J. PERKINS.
MEASURING MACHINE.
APPLICATION FILED JULY 31, 1903.
2 SHEETS—SHEET 1.
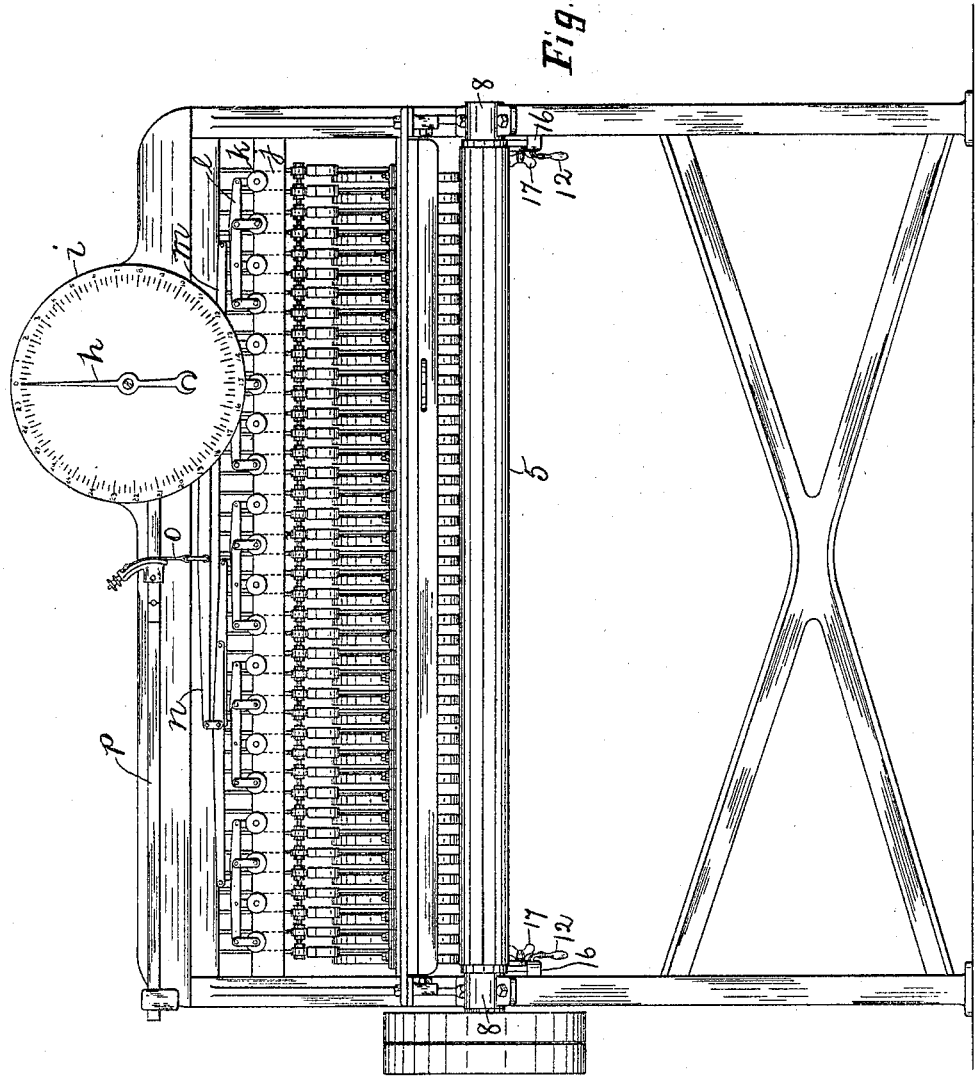
WITNESSES:
William A. Carlin
J. Murphy.
INVENTOR.
Franklin J. Perkins
BY Jas. H. Churchill
ATTORNEY.

No. 802,109. PATENTED OCT. 17, 1905.
F. J. PERKINS.
MEASURING MACHINE.
APPLICATION FILED JULY 31, 1903.

2 SHEETS—SHEET 2.

WITNESSES:
William A. Carlin
J. Murphy.

INVENTOR.
Franklin J. Perkins
BY
Jas. H. Churchill
ATTORNEY.

UNITED STATES PATENT OFFICE.

FRANKLIN JAY PERKINS, OF WOBURN, MASSACHUSETTS, ASSIGNOR, BY MESNE ASSIGNMENTS, TO THE TURNER TANNING MACHINERY COMPANY, OF BOSTON, MASSACHUSETTS, A CORPORATION OF MAINE.

MEASURING-MACHINE.

No. 802,109.     Specification of Letters Patent.     Patented Oct. 17, 1905.

Application filed July 31, 1903. Serial No. 167,716.

*To all whom it may concern:*

Be it known that I, FRANKLIN JAY PERKINS, of Woburn, county of Middlesex, and State of Massachusetts, have invented an Improvement in Measuring-Machines, of which the following description, in connection with the accompanying drawings, is a specification, like characters on the drawings representing like parts.
This invention relates to measuring-machines of the class shown and described in United States Patent No. 329,597, dated November 3, 1885, wherein a registering mechanism is operated by means of a series of measuring-wheels which are raised into operative connection with said registering mechanism by the hide, skin, or other surface to be measured, which latter is passed between the measuring-wheels and a bed-roll coöperating therewith. In machines of the class referred to provision is made for adjusting the machines to measure hides or skins and like material of different thickness, and this is accomplished in the said machines by adjusting the toothed segments individually with relation to their measuring-wheels, which is objectionable, as it not only requires considerable time to effect the adjustment, but also on account of the liability of error arising from the individual adjustment.

The present invention has for its object to overcome the defects and objections above referred to and to provide a measuring-machine of this class which can be adjusted to measure stock of different thickness substantially in an instant; and to this end the machine is provided with an adjustable bed-roll eccentrically mounted, so that the said bed-roll may be raised and lowered with relation to the toothed segments to adjust the machine to measure stock of different thickness without disturbing the toothed segments, as will be described, and with means for locking the eccentrically-mounted roll in its adjusted position.

Figure 3:
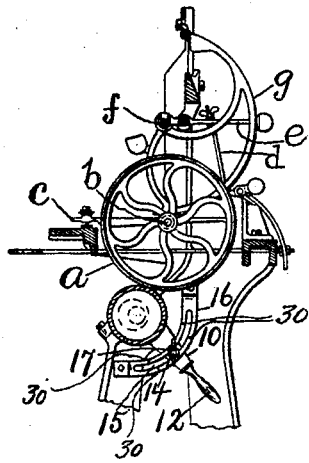
Figure 2:
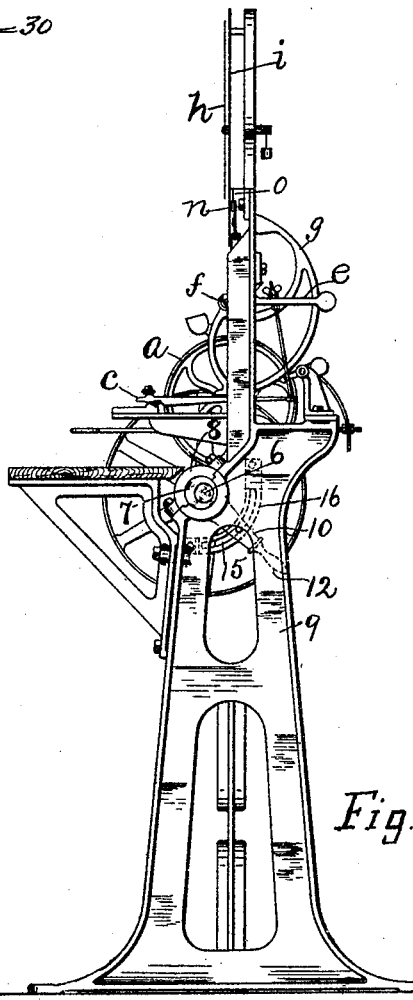

Figure 1 is a front elevation of a measuring-machine embodying this invention; Fig. 2, a side elevation of the machine shown in Fig. 1 looking toward the left, and Fig. 3 a detail in section to be referred to.

The main features of the measuring-machine herein shown are and may be the same as shown and described in the patent referred to. These features consist, essentially, of a series of measuring-wheels $a$, having their shafts $b$ supported by levers $c$, connected by links $d$ with levers $e$, which support the shafts $f$ of toothed segments $g$, which coöperate with and are rotated by toothed hubs or pinions not herein shown, but which are fast to the measuring-wheels $a$.

The toothed segments $g$ are connected with the registering mechanism, comprising the pointer $h$ and dial $i$, by cords or chains $j$, passed over pulleys $k$, carried by levers $l$, which are connected by intermediate levers $m$ with a main lever $n$, which is connected by a flexible connection or cord $o$ with a lever $p$, which is geared or otherwise operatively connected with the pointer $h$. The measuring-wheels $a$ are normally disengaged from the segments $g$ and rest upon a bed-roll 5, which in accordance with this invention is vertically adjustable, which may be accomplished as herein shown, and for this purpose the bed-roll is provided with journals 6, which are extended into bushings or bearing-sleeves 7, mounted to turn in suitable boxes 8, supported by the upright side frames 9 of the machine. The journals 6 are located eccentrically in the bushings or sleeves 7, and provision is made for turning the said sleeves in their boxes, so that the bed-roll and measuring-wheels resting thereon may be raised and lowered with relation to the toothed segments. This result may be accomplished, as herein shown, by means of cranks or arms 10, secured to or forming part of the sleeves 7, which cranks or arms may be provided with handles 12.
Provision is also made for locking the bed-roll in its adjusted position, and for this purpose each of the arms or cranks 10 is provided with screw-threaded pin or projection 14, which is extended through a slot 15 in a bracket or bar 16, attached to a side frame 9, and is engaged by a nut 17, which serves to clamp the crank or arm to the bracket 16. The brackets or slotted bars 16 may, if desired, be provided with suitable indications 30, (see Fig. 3,) such as scale marks or graduations, so that both bushings 7 may be turned the same amount when it is desired to adjust the bed-roll.

From the above description it will be seen that the bodily movement of the bed-roll effects a bodily movement of all of the measuring-wheels simultaneously, thereby enabling a measuring-machine embodying this invention to be adjusted for stock of different thickness substantially in an instant and without disturbing the toothed segments or the parts of the machine connected with the registering mechanism.

I have herein shown one means for effecting the adjustment of the eccentrically-mounted bed-roll; but I do not desire to limit my invention in this respect.

I claim—

1. In a measuring-machine, in combination, a registering mechanism, a plurality of bodily-movable measuring-wheels, mechanism for connecting said measuring-wheels with said registering mechanism, a stationary frame, and a bed-roll coöperating with said measuring-wheels and eccentrically mounted in said stationary frame to effect bodily movement of said bed-roll toward said measuring-wheels, for the purpose specified.

2. In a measuring-machine, in combination, a bed-roll, sleeves or bushings in which said roll is eccentrically mounted, mechanism for rotating said sleeves or bushings to effect bodily movement of the said roll, and means to lock said bed-roll in different positions into which it is moved, substantially as described.

3. In a measuring-machine, in combination, a bed-roll, sleeves or bushings in which said roll is eccentrically mounted, cranks or arms attached to said bushings or sleeves, and means to secure said cranks or arms in their adjusted positions and thereby lock said bed-roll in its adjusted positions, substantially as described.

4. In a measuring-machine, in combination, a bed-roll, bearings in which said bed-roll is eccentrically mounted, means for rotating said bearings to effect bodily movement of said bed-roll and means to lock said bed-roll in different positions into which it is moved, substantially as described.

In testimony whereof I have signed my name to this specification in the presence of two subscribing witnesses.

FRANKLIN JAY PERKINS.

Witnesses:
J. W. BYRON,
C. A. HAWKES.